United States Patent Office 3,240,718
Patented Mar. 15, 1966

3,240,718
REGENERATION AND RECOVERY OF
CATALYST FROM SLUDGE
John G. Gatsis, Des Plaines, Ill., assignor to Universal Oil
Products Company, Des Plaines, Ill., a corporation of
Delaware
No Drawing. Filed Nov. 13, 1963, Ser. No. 323,228
12 Claims. (Cl. 252—416)

The present invention relates to a regenerative process for hydrorefining of petroleum crude oil, heavy vacuum gas oil, crude tower bottoms, vacuum tower bottoms, visbreaker effluent, heavy cycle stocks, and other high-boiling hydrocarbon fractions and/or distillates. More specifically, the present invention is directed toward a catalytic process for hydrorefining heavy hydrocarbonaceous material severely contaminated by the presence of excessive quantities of deleterious substances. The present process involves continuing regeneration and recirculation of the catalyst employed therein.

In one of its various embodiments, the present invention involves a process for effecting the decontamination, or hydrorefining, of a heavy hydrocarbon charge stock for the primary purpose of effecting the destructive removal of nitrogenous and sulfurous compounds, and particularly for the conversion of the pentane-insoluble portion of such charge stock into useful pentane-insoluble hydrocarbon products. Crude petroleum oil, and other heavy hydrocarbon fractions and/or distillates, boiling at temperatures above the gasoline and middle-distillate boiling ranges, such as crude tower bottoms, vacuum gas oil, heavy cycle stocks, black oil, etc., generally contain nitrogenous and sulfurous compounds in large quantities. In addition, these high-boiling hydrocarbon fractions contain quantities of metallic contaminants which exhibit the tendency to exert detrimental effects upon the catalyst uilized in various processes to which the crude oil, or portion thereof, or other heavy hydrocarbonaceous material, is ultimately subjected. The more common of such metallic contaminants are nickel and vanadium, although other metals including iron, lead, arsenic, copper, etc., may be present. These metallic contaminants, as well as others, may be present within the hydrocarbonaceous material in a variety of forms; they may exist therein as metal oxides or as sulfides, introduced into the crude oil as metallic scale or particles; they may be in the form of soluble salts of such metals; usually, however, these contaminants are found to exist as organo-metallic compounds of high molecular weight, such as metal porphyrins and various derivatives thereof.

Where the metallic contaminants are present as oxide or sulfide scale, they may be removed, at least in part, by a relatively simple filtering technique, the water-soluble salts of such metals being removable by washing and subsequent dehydration. However, a much more severe treatment is generally required to remove, or destroy, the organo-metallic compounds, and to the extent that the resulting heavy hydrocarbonaceous fraction becomes suitable for further processing. Notwithstanding that the total concentration of these contaminants, for example metallic porphyrins, is relatively small, often less than about 10 p.p.m., calculated as the elemental metals, subsequent processing techniques are readily adversely affected thereby. For example, when a hydrocarbon charge stock, containing metals in excess of about 3.0 p.p.m., is subjected to a cracking process for the purpose of producing lower-boiling, normally liquid hydrocarbons, the metals become deposited upon the catalyst employed, steadily increasing in quantity until such time as the composition of the catalytic composite is changed to the extent that undesirable results are obtained.

In addition to the contaminating influences in the form of nitrogenous and sulfurous compounds, and metallic complexes, crude oils and other heavy hydrocarbon fractions generally consist of a significant quantity of high-boiling pentane-insoluble material. For example, a Wyoming sour crude oil, having a gravity of 23.2° API at 60° F., not only is contaminated by 2.8% by weight of sulfur, 2700 p.p.m. of total nitrogen, 100 p.p.m. of metallic porphyrins (computed as elemental nickel and vanadium), but also contains a high-boiling, pentane-insoluble asphaltenic fraction in an amount of about 8.39% by weight. Similarly, and a much more difficult charge stock to convert into valuable, useful normally liquid hydrocarbons, is a crude-tower bottoms product having a gravity, degrees API at 60° F., of 14.3, and contaminated by the presence of 3.0% by weight of sulfur, 3830 p.p.m. of total nitrogen, 85 r.p.m. of total metals and 10.93% by weight of asphaltenic compounds. Asphaltenes are high molecular weight hydrocarbons considered to be coke-precursors having the tendency to become immediately deposited within the reaction zone and other process equipment, and onto the catalytic composite in the form of a gummy, high molecular weight residue. Since this in effect constitutes a large loss of charge stock, it is economically desirable to convert such asphaltenes into pentane-soluble liquid hydrocarbon fractions. Furthermore, the presence of excessive quantities of asphaltenes and organo-metallic contaminants appears to inhibit the activity of the catalyst with respect to the removal of sulfur and nitrogen.

The object of the present invention is to provide a more efficient process for hydrorefining, or decontaminating, such petroleum crude oils, than the processes currently being employed. A fixed-bed catalytic process, or a fixed-fluidized bed process for the hydrorefining of highly contaminated heavy hydrocarbonaceous material, is virtually precluded due to the difficulty in maintaining the catalyst in an active condition. Various moving-bed processes employing catalytically active metals deposited upon refractory inorganic oxide materials, such as silica and/or alumina, are extremely erosive, thereby causing plant maintenance to become difficult and expensive. The present invention teaches the preparation of a colloidally dispersed unsupported catalyst useful in a regenerative slurry process, which catalyst will not effect extensive erosion of the process equipment. The present process yields a liquid hydrocarbon product which is more suitable for further processing, without experiencing the difficulties otherwise resulting from the presence of the above-described contaminants. The catalyst of the present invention is particularly advantageous for effecting the removal of the organo-metallic complexes, without significant product yield loss while simultaneously converting pentane-insoluble material into pentane-soluble liquid hydrocarbons, notwithstanding the high concentrations of the other contaminating influences.

Therefore, in a broad embodiment, the present invention relates to a regenerative process for hydrorefining a hydrocarbon charge stock, which process comprises the steps of: (a) admixing said charge stock with at least one organo-metallic compound selected from the metals of Group VI–B having an atomic number greater than 24 and Group V–B of the Periodic Table; (b) decomposing said organo-metallic compound in said charge stock and reacting the resulting colloidal suspension with hydrogen; (c) separating the resulting reaction mixture to provide a hydrorefined liquid product and a catalyst-containing sludge; (d) dissolving the organic-soluble material in said sludge and combining the resulting solution with said charge stock; (e) oxidizing the remaining portion of said catalyst-containing sludge in the presence of water; and, (f) admixing the resulting aqueous solution of the aforesaid metals with said charge stock.

In particular, the present invention encompasses a process for hydrorefining a hydrocarbon charge stock, which process comprises steps of: (a) admixing said charge stock with at least one carbonyl of the metals of Group VI–B having an atomic number greater than 24, and Group V–B of the Periodic Table; (b) heating the resulting mixture at a temperature less than about 310° C., and for a time sufficient to decompose said carbonyl within said charge stock; (c) reacting the resulting colloidal suspension with hydrogen at a temperature within the range of from about 225° C. to about 500° C. and under a pressure of from about 500 to about 5000 p.s.i.g.; (d) separating the resulting reaction mixture to provide a hydrorefined liquid product and a catalyst-containing sludge; (e) dissolving the organic-soluble material in said catalyst-containing sludge and combining the resulting solution with said charge stock; (f) oxidizing the remaining portion of said catalyst-containing sludge in the presence of water; and, (g) combining the resulting aqueous solution of the aforesaid metals with said hydrocarbon charge stock and reacting the resulting colloidal suspension with hydrogen as aforesaid.

A more limited embodiment of the present invention encompasses a process for hydrorefining a petroleum crude oil containing pentane-insoluble asphaltenes, which process comprises the steps of: (a) admixing said crude oil with at least one beta-diketone complex of the metals of Group VI–B having an atomic number greater than 24, and Group V–B of the Periodic Table; (b) decomposing said beta-diketone complex in said charge stock at a temperature less than about 310° C. and reacting the resulting colloidal suspension with hydrogen and added hydrogen sulfide at a temperature within the range of from about 225° C. to about 500° C. and under a pressure of from about 500 to about 5000 p.s.i.g.; (c) separating the resulting reaction mixture to provide a hydrorefined liquid product and a catalyst-containing sludge; (d) dissolving the organic-soluble material in said catalyst-containing sludge and combining the resulting solution with said charge stock; (e) oxidizing the remaining portion of said sludge in the presence of water; and, (f) combining the resulting aqueous solution of the aforesaid metals with said charge stock, and reacting the resulting colloidal suspension with hydrogen and added hydogen sulfide as aforesaid.

From the foregoing embodiments, it is readily ascertained that the method of the present invention involves the preparation of a catalyst utilizing metals selected from the group consisting of the metals of Group VI–B and having an atomic number greater than 24, and Group V–B of the Periodic Table. Therefore, the catalyst prepared may comprise one or more metallic components from in accordance with the method of the present invention, the group of vanadium, niobium, tantalum, molybdenum, tungsten, and mixtures of two or more. It will be noted that the metal selected from Group VI–B, namely molybdenum and/or tungsten, has an atomic number greater than 24. It has been found that organo-chromium compounds do not yield comparable results upon subsequent reaction with hydrogen, and in particular do not effect a suitable degree of conversion of the pentane-insoluble material and the destructive removal of the organo-metallic contaminants such as the nickel and/or vanadium porphyrins. The catalyst is prepared by initially dissolving an organic complex of the selected metal, or metals, in the hydrocarbon charge stock containing a pentane-insoluble fraction which is to be converted into soluble hydrocarbons. The quantity of the organo-metallic compounds employed is such that the colloidal suspension, or dispersion, resulting when the organo-metallic compound is decomposed in the hydrocarbon charge stock, comprises from about 1.0% to about 10.0% by weight, calculated as if the metal existed in the elemental state. Suitable organo-metallic compounds include molybdenum blue, molybdenum hexacarbonyl, phosphomolybdic acid, molybdyl acetylacetonate, silicomolybdic acid, tungsten hexacarbonyl, phosphotungstic acid, tungsten acetylacetonate, silicotungstic acid, tungsten ethylanthate, vanadium carbonyl, phosphovanadic acid, vanadyl acetylacetonate, vanadyl ethylxanthate, other carbonyls, heteropoly acids, beta-diketone complexes, etc.

Briefly, the process is effected by initially mixing the desired quantity of the organo-metallic compound, for example, a mixture of phosphomolybdic acid and vanadyl acetylacetonate in the hydrocarbon charge stock, and in amounts such that the resulting colloidal suspension or dispersion, contains from about 1.0% to 10.0% by weight of molybdenum and vanadium, calculated as the elements thereof. In order to facilitate the formation of the colloidal suspension, upon decomposition of the organo-metallic compound, it is often advisable to form a solution of such organo-metallic compound in a suitable solvent such as an alcohol, a ketone, as ester, etc., adding such solution dropwise to the hydrocarbon charge stock. The resulting mixture is then heated, preferably in the absence of free hydrogen and other well-known reducing agents, at a temperature less than about 310° C. for a time sufficient to effect the decomposition of the organo-metallic compound, and to remove the solvent by distillation, thereby forming a colloidal suspension, or dispersion of the metallic component within the hydrocarbon charge stock. The colloidal dispersion is then passed into a suitable reaction zone maintained at a temperature within the range of from about 225° C. to about 500° C. and under a hydrogen pressure within the range of about 500 to about 5000 p.s.i.g. The presence of added hydrogen sulfide, within the hydrogen atmosphere, has been found to enhance the catalytic activity of most of the organo-metallic compounds, and particularly the beta-diketone complexes of vanadium and tungsten, and such hydrogen sulfide is added in an amount within the range of about 1.0% to about 15.0% by volume prior to effecting the hydrorefining reactions.

In order to maintain the catalyst in its decomposed form, which is believed to be either as the elemental metal, or as a lower oxide thereof, it is necessary that the reaction zone be substantially completely free from carbon monoxide. Following the decomposition of at least some of the foregoing organo-metallic compounds, such as molybdenum hexacarbonyl, some carbon monoxide will be present in the gaseous phase; this is readily removed by venting prior to passing the mixture into the reaction zone. Where some of the carbon monoxide is dissolved in the liquid phase, it is preferred to remove the same by suitable stripping means. When effected in a continuous manner, the process may be conducted in either upward flow or downward flow. The normally liquid hydrocarbons are separated from the total reaction zone product effluent by any suitable means, for example, through the utilization of a centrifuge, or settling tanks, the remaining catalyst-containing sludge being treated as hereinafter set forth.

Following the separation of the normally liquid hydrocarbons from the catalyst-containing sludge, the latter is treated with a suitable organic solvent for the purpose of dissolving residual organic-soluble material such as the heavy hydrocarbon products resulting from the conversion of the pentane-insoluble asphaltenic compounds originally present in the petroleum crude oil. Any well-known organic solvent may be employed for the dissolution of the organic-soluble material in the catalyst-containing sludge; suitable solvents include, therefore, pentane, benzene, carbon tetrachloride, toluene, etc. The resulting solution may be subjected to further reaction with hydrogen by recycling the same to combine with the fresh hydrocarbon charge stock. The remaining portion of the catalyst-containing sludge is then treated in the presence of water with an oxidizing agent capable of oxidizing the metallic components within said sludge to a water-soluble form. Suitable oxidizing agents for utilization in converting the metals contained within the sludge include hydrogen peroxide, oxygen, ozone, and other oxidizing agents which are capable of converting the metals, or components, to a water-soluble form. The oxidization treatment may be effected at ambient or elevated temperatures up to about 900° F., although lower temperatures below about 500° F. are generally preferred. The resulting aqueous solution, containing water-soluble compounds of the foregoing metals, including those metals originally existing within the crude oil in the form of contaminating influences, is separated from the insoluble portion of the sludge, and combined with the charge stock, forming a colloidal suspension or dispersion as aforesaid. In many instances, it will be desirable to extract the metallic compounds with an alcohol, ketone, and/or ester containing up to about 10 carbon atoms per molecule, in order to facilitate the formation of the colloidal suspension with the metals recovered from the catalyst-containing sludge. The insoluble sludge may then be processed for the purpose of recovering various metals, particularly nickel and vanadium. Prior to combining the metals recovered from the sludge with the fresh hydrocarbon charge stock, it may be desirable to withdraw at least a portion of such metals, generally from 0.1% to about 1.0% by weight in order to maintain the highest possible degree of catalytic activity. Consequently, a like quantity of metal is added to the hydrocarbon charge stock as the organo-metallic compound, to compensate for the quantity of metal removed from the sludge, prior to combining the latter with said charge stock. The aqueous solution of metal recovered from the catalyst-containing sludge will contain the original metallic components utilized as the catalyst, and, in addtiion thereto, at least a portion of the vanadium originally existing in the charge stock as a porphyrin or a derivative thereof. Since the vanadium component, when colloidally dispersed within the charge stock, exhibits an acceptable degree of catalytic activity, very little fresh catalyst is necessary to maintain catalytic activity, and in many instances the catalyst may be considered as self-sustaining. In any event, the water-soluble metals recovered from the catalyst containing sludge are combined with fresh hydrocarbon charge stock, the mixture being heated to a temperature not above 310° C..

Although the process of the present invention is conducted in the presence of hydrogen, the decomposition of the organo-metallic compounds, such as molybdenum hexacarbonyl and vanadium acetylacetonate, is necessarily effected in the absence thereof. The removal of carbon monoxide during the decomposition is also important because it will facilitate the formation of the collodial suspension. Depending upon the particular organo-metallic compound selected as the catalyst source, the dispersed material is believed to be the elemental metal or a lower oxide form thereof. Although analytical methods including X-ray diffraction, have not revealed the precise physical and/or chemical state of the colloidally dispersed material, it is believed that the same exists as a complex with the asphaltenic compounds initially present in the charge stock, or as the elemental metal or an oxide form, as hereinbefore stated.

The following examples are given to illustrate the process of the present invention, and the effectiveness thereof in removing nickel and vanadism porphyrins from a petroleum crude oil, and in converting the pentane-insoluble asphaltenes while simultaneously effecting the conversion of sulfurous and nitrogenous compounds into sulfur-free and nitrogen-free hydrocarbons. It is not intended that the present invention be unduly limited to the catalyst, charge stock and/or operating conditions employed in this illustration.

*Example 1*

The crude oil employed to illustrate the benefits afforded through the utilization of the present invention was a Wyoming sour crude oil, having a gravity of 23.2° API at 60° F., and containing about 2.8% by weight of sulfur, approximately 2700 p.p.m. of nitrogen, 18 p.p.m. of nickel and about 81 p.p.m. of vanadium, as metal porphyrins, calculated on the basis of the elemental metal. In addition, the sour crude oil consisted of about 8.39% by weight of pentane-insoluble asphaltenes. As hereinafter indicated, the process of the present invention effects the conversion of a significant proportion of such asphaltenes and to the degree that the same no longer exert a detrimental effect upon further processing. The collodially dispersed catalysts were prepared by decomposing the indicated organo-metallic compounds within the Wyoming sour crude oil, thereafter subjecting the mixture to conversion in a rotating autoclave at a temperature of about 400° C. and under an imposed hydrogen pressure of about 200 atmospheres. Each of the colloidal suspensions remained in the autoclave at the foregoing conditions for a period of from about four to about eight hours or more.

Molybdenum hexacarbonyl, in an amount of 23.3 grams, was admixed with 200 grams of the Wyoming sour crude, the mixture being charged to the rotating autoclave and heated to a temperature of 250° C. for a period of three hours. After venting to remove carbon monoxide, the autoclave was pressured to 100 atmospheres with hydrogen and then heated to a temperature of 400° C. for a period of about four hours, the final pressure being about 200 atmospheres. The gravity, ° API at 60° F., of the resulting normally liquid product effluent, following separation thereof from the catalyst-containing sludge, was 40.1, indicating a signficant degree of conversion to lower-boiling hydrocarbon products. Upon analysis, this liquid product indicated the continued presence of only 7.1 p.p.m. of nitrogen, about 0.02% by weight of sulfur, about 0.10% by weight of pentane-insoluble asphaltenes, less than about 0.02 p.p.m. of nickel and less than about 0.02 p.p.m. of vanadium. When utilizing 23.3 grams of molybdenum hexacarbonyl decomposed in situ, in the presence of hydrogen, the final liquid product was found to contain 347 p.p.m. of nitrogen compared to 7.1 p.p.m., as hereinabove set forth.

*Example II*

A mixture of the Wyoming sour crude and colloidally dispersed vanadium component was prepared by adding a solution of about 42 grams of vanadyl acetylacetonate in 500 grams of normal amyl alcohol to 250 grams of the sour Wyoming crude, the mixture being stirred at a temperature of about 160° C. during the addition. The alcoholic solvent was recovered in an overhead condenser. Thereafter, 100 grams of the mixture was sealed in an 850 cc. rotating autoclave and pressured to 100 atmospheres with hydrogen. The contents were heated to a temperature of 400° C., the resulting final pressure being about 200 atmospheres, which conditions were maintained for a period of about eight hours. The hydrorefined product, consisting of normally liquid hydrocarbons, was separated from the catalyst-containing sludge and found to contain about 0.308% by weight of pentane-insoluble asphaltenes, less than about 0.03 p.p.m. of nickel, less than about 0.6 p.p.m. of vanadium and 0.19% by weight of sulfur.

*Example III*

A normal amyl alcohol solution of 23.2 grams of molybdenum hexacarbonyl and 42 grams of vanadyl acetylacetonate is added dropwise to 450 grams of sour Wyoming crude oil hereinabove described, the resulting mixture being intimately admixed with a vibromixture at a temperature of about 200° C., at which temperature the normal amyl alcohol is readily distilled, leaving the molybdenum and vanadium components colloidally dispersed in the crude oil. The mixture is placed within the rotating autoclave and pressured to 100 atmospheres with hydrogen. The temperature is increased to 400° C., the resulting pressure being about 200 atmospheres, and the autoclave maintained at these conditions for a period of about six hours. Following separation from the catalyst-containing sludge, the normally liquid product effluent is found to have a gravity, ° API at 60° F., of about 35.5. Upon analysis, this normally liquid product is found to contain less than about 10 p.p.m. of nitrogen, less than 0.02% by weight of sulfur, about 0.15% by weight of pentane-insoluble asphaltenes, less than about 0.1 p.p.m. of nickel and less than about 0.1 p.p.m. of vanadium.

The remaining catalyst-containing sludge, in an amount of about 60 grams, is admixed with about 60 cc. of benzene, the resulting mixture being stirred for a period of about one-half hour. Following centrifugal separation, the benzene solvent and organic-soluble portion of the catalyst-containing sludge is admixed with fresh crude oil, the insoluble portion of the sludge in an amount of about 50 grams being slurried with 500 milliliters of an aqueous solution of hydrogen peroxide in an amount of about 10.0% by volume. The insoluble sludge and hydrogen peroxide solution is intimately admixed for a period of about one hour at a temperature of about 300° C., for the purpose of oxidizing the metallic components to a water-soluble form. The resulting mixture is subjected to centrifugal separation, following which the aqueous solution is added dropwise to the mixture of fresh crude oil and benzene solution of the organic-soluble matter. The centrifuged solids, remaining after extracting the metals therefrom with the aqueous solution of hydrogen peroxide, are in an amount of about 5.0 grams.

The mixture of crude oil and benzene soluble material is heated to a temperature of about 160° C., the aqueous solution of metallic components being added dropwise thereto. The resulting colloidal dispersion is placed within the rotating autoclave and pressured to 100 atmospheres with hydrogen as before. The autoclave is heated to a temperature of 400° C. for a period of about eight hours, the final pressure being about 200 atmospheres. The total reaction zone product effluent is passed into a centrifugal separator from which the normally liquid hydrocarbon product, substantially free from solids, is removed. This liquid product contains less than about 10 p.p.m. of nitrogen, less than about 0.10% by weight of sulfur, about 0.02% by weight of pentane-insoluble asphaltenes, less than about 0.10 p.p.m. of nickel and less than about 0.10 p.p.m. of vanadium.

The foregoing specification and examples clearly illustrate the advantages afforded the hydrorefining of petroleum crude oils through the utilization of the regenerative process of the present invention. It is of particular interest to note that the concentration of nickel and vanadium, existing as organo-metallic complexes, as well as the pentane-insoluble asphaltenes, have been decreased to a level permitting subsequent utilization of the crude oil for further processing, and that at least a portion of the crude oil was converted to lower-boiling hydrocarbon products. Furthermore, the catalyst-containing sludge, following oxidation as hereinbefore set forth, is readily utilized in the formation of a colloidal dispersion to be reacted with hydrogen in the manner hereinbefore set forth.

I claim as my invention:

1. In the process for the regeneration and recovery of a catalyst degradation product from sludge containing the same obtained from the hydrofining of a petroleum crude with a decomposed organo-metallic catalyst, the steps of separating liquid hydrofining product from the sludge, extracting organic soluble material from the sludge with a solvent therefor, oxidizing the remaining portion of said sludge in the presence of water, and recycling the extracted organic soluble material and the oxidized portion of the sludge to untreated charge stock.

2. The process as defined by claim 1 further characterized in that said catalyst comprises at least one organo-metallic compound of the metals of Group VI–B having an atomic number greater than 24, and Group V–B of the Periodic Table.

3. The process of claim 1 further characterized in that said organo-metallic compound comprises an organo-molybdenum compound.

4. The process of claim 1 further characterized in that said organo-metallic compound comprises an organo-tungstic compound.

5. The process of claim 1 further characterized in that said organo-metallic compound comprises an organo-vanadic compound.

6. The process as defined by claim 1 further characterized in that said catalyst comprises at least one heteropoly acid of the metals of Group VI–B having an atomic number greater than 24, and Group V–B of the Periodic Table.

7. The process of claim 6 further characterized in that said heteropoly acid comprises phosphomolybdic acid.

8. The process of claim 6 further characterized in that said heteropoly acid comprises silicomolybdic acid.

9. The process of claim 6 further characterized in that said carbonyl comprises molybdenum hexacarbonyl.

10. The process as defined in claim 1 wherein said catalyst comprises at least one beta-diketone complex of the metals of Groups VI–B, having an atomic number greater than 24, and Group V–B of the Periodic Table.

11. The process of claim 10 further characterized in that said beta-diketone complex comprises vanadyl acetylacetonate.

12. The process of claim 10 further characterized in that said beta-diketone complex comprises molybdyl acetylacetonate.

References Cited by the Examiner

UNITED STATES PATENTS

| | | | |
|---|---|---|---|
| 3,161,584 | 12/1964 | Gleim | 208—264 |
| 3,173,860 | 3/1965 | Gatsis | 208—264 |
| 3,180,822 | 4/1965 | Gatsis | 208—264 |

DELBERT E. GANTZ, *Primary Examiner.*